No. 850,040. PATENTED APR. 9, 1907.
J. A. McMANUS.
CUSHION HUB.
APPLICATION FILED OCT. 30, 1905.

Witnesses
D. Webster Jr.
J. Williamson

Inventor
John A. McManus
By

UNITED STATES PATENT OFFICE.

JOHN A. McMANUS, OF PHILADELPHIA, PENNSYLVANIA.

CUSHION-HUB.

No. 850,040.                    Specification of Letters Patent.          Patented April 9, 1907.

Application filed October 30, 1905. Serial No. 284,954.

*To all whom it may concern:*

Be it known that I, JOHN A. MCMANUS, a citizen of the United States, residing at Philadelphia, county of Philadelphia, and State of Pennsylvania, have invented a certain new and useful Improvement in Cushion-Hubs, of which the following is a specification.

My invention relates to a new and useful improvement in cushion-hubs for vehicles, and has for its object to provide a simple and effective device of this description which in practice will absorb the shock attendant upon the travel of the wheel over a road-bed, thereby obviating the necessity of using an ordinary pneumatic tire, while at the same time relieving the body of the vehicle and its occupants of the vibration and jar as effectively as though a pneumatic tire were used.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
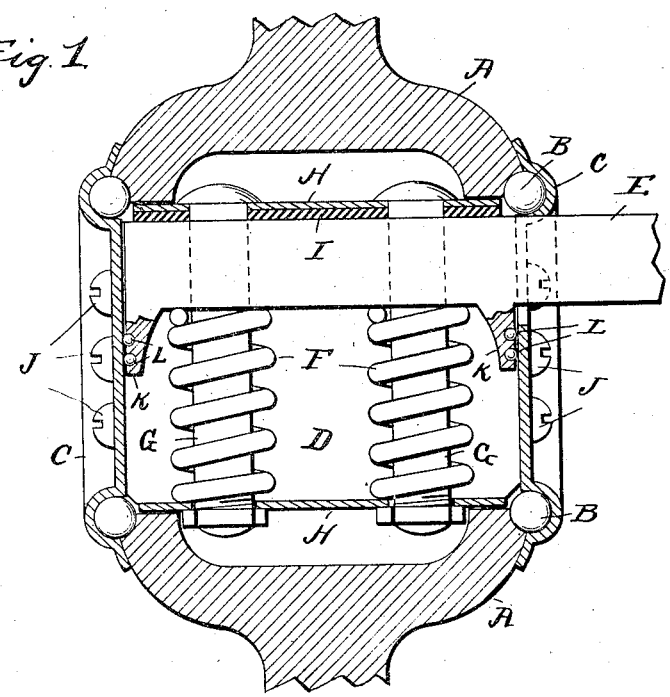
Figure 2:
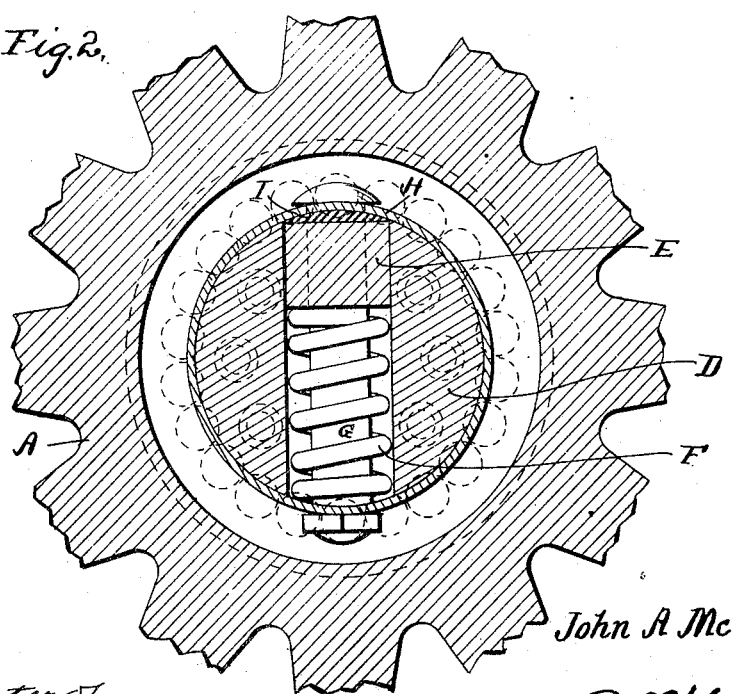

Figure 1 is a vertical section of the hub and box made in accordance with my improvement, showing the axle within the said box; Fig. 2, a section at right angles to Fig. 1.

Referring to the drawings, A represents the hub, which may be of any suitable construction, said hub being provided with grooves around its ends for the travel of the balls B, and these balls are housed by the caps C, the latter also having grooves therein for the travel of said balls.

D represents the box of cylindrical form having a slot therein for the reception of the axle E, said axle being fitted in said slot so as to have a vertical sliding movement and resting upon the springs F, also located within the slot formed in the box, and in order that said springs may be held in alinement and the axle further guided the bolt-rods G are run through the slot in the box and also other suitable holes formed in the axle, as clearly shown in the drawings.

A sleeve H is fitted around the box, the bolt-rods G passing through said sleeve, so as to hold it in place, and this sleeve serves to limit the upward movement of the axle, and in order to prevent undue hammering upon the sleeve by the axle a rubber cushion I is interposed between the axle and the top of the sleeve.

The end caps C are secured to the box by means of the screws J, so as to remain stationary with said box and the axle, while the hub A travels around the same upon the balls, which travel in the grooves formed in said caps, as before stated. The caps C also serve to take up the end thrust of the axle, the latter being provided with the depending brackets K, each of which has a series of balls L set therein so as to ride upon the inner surface of the caps, as will be readily understood.

Of course I do not wish to be limited to the exact form of springs here shown, as elliptical or semi-elliptical springs might be used with equal efficiency, or a pneumatic bag might be placed within the slot formed in the box and inflated, so as to support the axle.

My improvement, while accomplishing all that the pneumatic tire is supposed to accomplish in the way of relieving the shock incident to traveling over a road-bed, obviates the serious difficulty heretofore experienced in the use of the pneumatic tire from puncture or deflation and has the advantage that should the springs become broken the vehicle can still continue on its course, which will not be the case where a pneumatic tire becomes injured.

Having thus fully described my invention, what I claim as new and useful is—

1. In combination with the axle of the vehicle, a box having a slot therein for the reception of said axle, springs located within the box for supporting the axle, a sleeve secured around the box, two caps secured to the ends of the box, said caps having grooves therein, a hub having grooves in the ends thereof, and two sets of balls, one set adapted to run in each of the grooves formed in the caps and the hub, as specified.

2. The herein-described combination of the axle, a box having a slot therein for the reception of said axle, springs located within the box for supporting the axle, a sleeve surrounding the box, bolt-rods passing through the box and axle securing the sleeve in place, a cap secured to each end of the box, said caps having annular grooves formed therein, a series of balls adapted to travel in each of said grooves, a hub fitted around said sleeve and adapted to travel upon said balls, and depending brackets formed with the axle and having balls therein for riding upon the inner surface of the caps as specified.

In testimony whereof I have hereunto affixed my signature in the presence of two subscribing witnesses.

JOHN A. McMANUS.

Witnesses:
MARY E. HAMER,
S. S. WILLIAMSON.